United States Patent
Gessler

[15] 3,703,967
[45] Nov. 28, 1972

[54] ROTOR ARM FOR SILO DISCHARGING DEVICES

[72] Inventor: Hans Gessler, Aalen, Germany

[73] Assignee: Schwabische Huttenwerke Gesellschaft mit beschrankter Haftung, Wasseralfingen/Wurtt., Germany

[22] Filed: Jan. 13, 1971

[21] Appl. No.: 106,039

[30] Foreign Application Priority Data

Jan. 13, 1970   Austria................A 282/70

[52] U.S. Cl..................214/17 D, 222/228, 267/53, B65g/65/48

[58] Field of Search........214/17 D, 17 DA; 198/212; 222/228; 267/53

[56] References Cited

UNITED STATES PATENTS

| | | |
|---|---|---|
| 1,114,312 | 10/1914 | Tomasini....................267/53 |
| 1,232,443 | 7/1917 | Turner.........................267/53 |
| 1,987,189 | 1/1935 | Geyer..........................267/53 |

FOREIGN PATENTS OR APPLICATIONS

| | | |
|---|---|---|
| 1,801,504 | 5/1970 | Germany................214/17 D |
| 296,522 | 5/1965 | Netherlands............214/17 D |
| 618,704 | 2/1949 | Great Britain...............267/53 |

*Primary Examiner*—Robert G. Sheridan
*Attorney*—Walter Becker

[57] ABSTRACT

A rotor arm for connection to the motor of silo discharging devices with a packet of spring leaves which in their longitudinal direction are slidably held together by holding means while pressure exerting means exert upon those surfaces of said spring leaves which slidably engage each other a pressure slidably holding said spring leaves together over those sections which are located in front and behind said holding means.

20 Claims, 6 Drawing Figures

PATENTED NOV 28 1972　3,703,967

Inventor:
Hans Gessler
By
Walter Becker

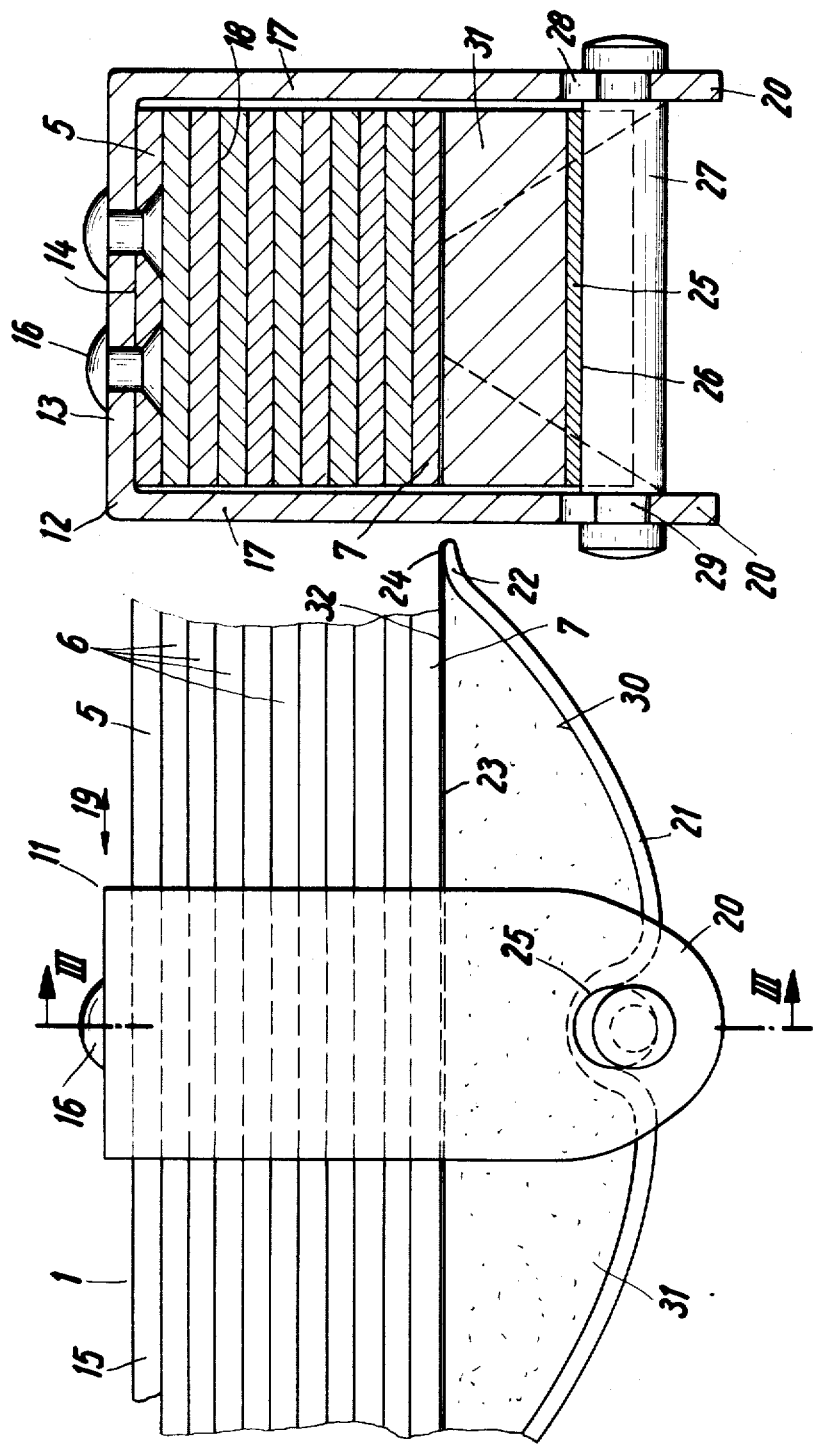

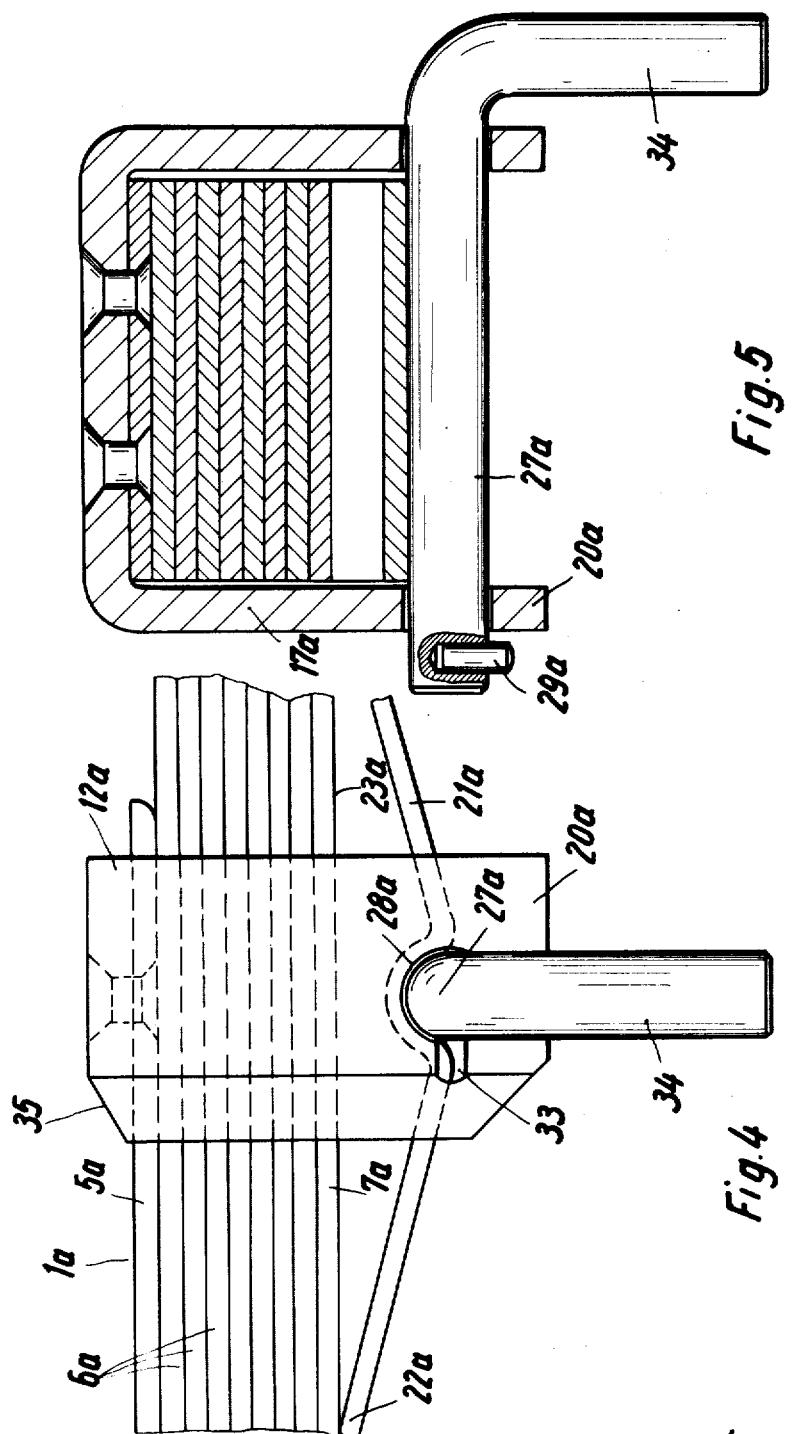

ROTOR ARM FOR SILO DISCHARGING DEVICES

The present invention concerns a rotor arm for silo discharging devices with a packet of leaf springs the individual spring leaves of which engage each other so as to be slidable relative to each other in the longitudinal direction of said leaf springs, said spring leaves being held together by holding means.

Rotor arms of this type have been used for loosening and feeding the pourable material in silo and bin discharging devices while one or more rotor arms are adapted to rotate about the vertical central axis of the silo. The rotor arms are for instance tangentially connected to the outer surface of a rotor which may for instance have a cylindrical contour. These rotor arms are so dimensioned that when under an extreme load, they will have the major portion of their length extend around the drum-shaped rotor. The rotor arms are in most instances built up in such a manner that they will have the greatest number of individual spring leaves in that zone which is closest to the rotor. These spring leaves are stepped lengthwise so that toward the free end of the rotor arm, the number of the spring leaves and thereby the spring force of the rotor arm will decrease.

In spite of this design and arrangement of the rotor arms with which a too strong bending of the spring in view of an overload will be excluded, breakage of the springs still occurs. Such breakage occurs particularly when the individual spring leaves are no longer able to slide relative to each other in their longitudinal direction. The necessary displaceability in longitudinal direction is not reduced when pourable material gets between the spring leaves, in other words, along sliding surfaces thereof and gets stuck so that the spring leaves curve and can no longer slide relative to each other in their longitudinal direction or relative to the holding means therefor. As a result thereof, individual spring leaves, especially those located on the outside of the spring packet, will buckle when the spring leaves are subjected to a major pressure in the longitudinal direction thereof.

It is, therefore, an object of the present invention to provide a rotor arm of the above mentioned general type which, while being of a simple construction, will prevent or at least make it rather difficult for pourable material to enter between the individual spring leaves.

It is another object of this invention so to design a rotor arm built up of a plurality of spring leaves in such a way that the spring packets can easily be disassembled for purposes of lubricating the same or exchanging individual spring leaves.

These and other objects and advantages of the invention will appear more clearly from the following specification in connection with the accompanying drawings, in which:

FIG. 1 diagrammatically illustrates a top section of a rotor equipped with rotor arms according to the invention.

FIG. 2 illustrates a portion of the rotor arm of FIG. 1 but on a considerably greater scale than the latter.

FIG. 3 represents a section taken along the line III — III of FIG. 2.

FIGS. 4 and 5 respectively illustrate in side view and cross section a further embodiment of a rotor arm according to the invention, FIG. 5 being a section taken along the line V — V of FIG. 4.

Figure 6:
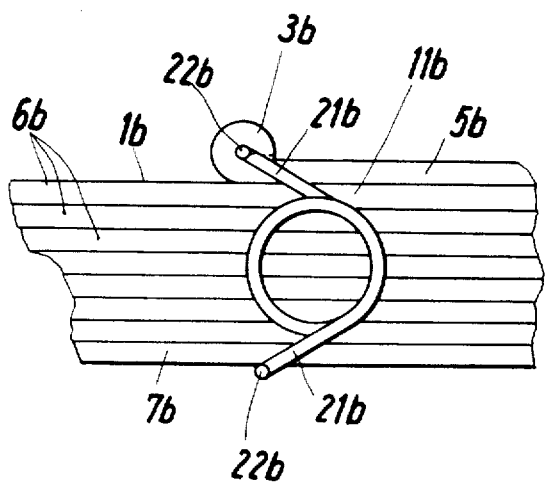

FIG. 6 represents a side view of a further embodiment according to the invention.

The rotor arm for silo discharging devices according to the present invention is characterized primarily in that the rotor arm has at least one pressure spring for compressing the spring leaves in a direction transverse to their sliding surface. The spring packet of the agitating arm is thus resiliently held together in such a way that the individual spring leaves while being displaceable relative to each other in their longitudinal direction will have their sliding surfaces in close engagement with each other so that, for all practical purposes, no silo material can enter the spring packet and the spring leaves will therefore even under unfavorable condition remain displaceable relative to each other in their longitudinal direction.

The pressure spring may in a simple manner be mounted on the respective holding means holding the spring packet together.

A very simple design is obtained when the pressure spring is supported along the free outer side of one of the spring leaves, preferably in a slidable manner, so that the spring can be designed as pressure spring.

For purposes of obtaining a good pressing effect with a relatively small pressure spring, it is suggested according to the invention, at that side of the spring packet which faces away from the pressure spring, to provide a counter bearing for supporting the spring packet against the force of the pressing spring. With a simple design of this type, the counter bearing is formed by a web of the U-shaped holding means which extends around the spring packet and on which the pressure spring is mounted.

The pressing effect of the pressure spring is transmitted over a relatively large longitudinal range of the leaf spring packet when the pressure spring is supported at two areas which are substantially symmetrical to and at both sides of the central plane of the counter bearing and which when viewing in the longitudinal direction of the spring leaf packet are located one behind the other on the leaf spring packet. Expediently, the pressure spring when viewing in the longitudinal direction of the spring packet is mounted in the central portion of the yoke which extends around the spring packet so that the pressure spring will at substantially even spring force engage the two pressing areas.

In order to make sure that the pressure spring will align itself so as to assume the respective most favorable position, it is expediently pivotable about an axis which extends transverse to the longitudinal direction of the leaf spring packet and parallel to the sliding surfaces thereof.

According to a further development of the invention, the pressure spring is easily detachably arranged so that the leaf spring packet can easily be disassembled. If, due to extraordinary circumstances, it should happen that silo material enters the spring packet or that an individual spring leaf is worn, this detachable connection of the pressure spring facilitates the cleaning and/or exchange of spring leaves. Thus, after the pressure springs have been loosened, it is possible for instance to lubricate the spring leaves.

According to a preferred embodiment of the present invention, the yoke, the web of which forms the counter bearing, has two parallel legs which are arranged at a slight lateral distance from the leaf spring packet while the pressure spring is so arranged at the ends of said legs that the spring leaves will by means of said counter bearing also be secured against lateral displacement and the holding means for the pressure spring will require only little space. Expediently, for mounting the spring, the legs are provided with a bolt connecting said legs, which bolt is preferably arranged in spaced relationship to the spring packet. A very simple mounting of the pressure spring is obtained when the latter under a preload and with a recess or curvature engages that side of the bolt which faces the spring leaf packet.

The bolt may be easily detachably arranged so that together therewith also the pressure spring can easily be withdrawn. This may be realized for instance by securing the bolt in recesses of the legs of the yoke and securing said bolt against axial displacement. Expediently, the bolt extends behind the marginal area of the recess at the outer and/or inner side of the leg so that the bolt is secured in a simple manner in axial direction.

According to a particularly simple design, the circumference of the bolt is provided with at least one depression, especially an annular groove, in which the marginal area of the pertaining recess of the yoke leg is located. However, the bolt may have an end collar while its other end is provided with a detachable securing member, especially a Seeger ring or spring ring. Furthermore, it is possible to secure the bolt in an advantageous manner to the yoke by means of a bayonet joint. The bayonet joint may, for instance, be formed by a marginal slot in the recess in the leg of the yoke and a cam on the bolt, which cam is preferably formed by a radial pin. In particular in this instance, in which a rotary movement is necessary for loosening the bolt, it is expedient so to design the bolt that it is angled off at one end so that a lever arm is formed by means of which the bolt can be pivoted. When the spring packet is in operation, the lever arm will automatically adjust itself in the longitudinal direction of the spring packet. In this position, the bolt is secured against axial displacement. The holding yoke is slanted at those surfaces which point toward the rotor axis. In this way, it will be assured that the pressure exerted by the pouring material upon the holding yoke will be reduced in the longitudinal direction of the spring packet.

Expediently, a plurality of pressure springs are, in the longitudinal direction of the spring leaf packet, arranged one behind the other while being spaced from each other.

According to a further development of the invention, the pressure spring is formed by a spring yoke which is simple to produce and to assemble. Expediently, the spring yoke is curved while preferably the leg ends thereof engage the spring leaf packet, and in the center between its leg ends there is formed a trough engaged by the counter bearing bolt.

According to a further feature of the invention, a hollow space formed by the spring is filled with a filling member so that no pourable or silo material can collect or accumulate in said hollow space. In order to assure that the elastic movements of the spring will not be impeded by the filling member, the filling member consists of an elastic material, especially soft rubber, and may in a simple manner by adhesion, for instance, by vulcanization, be connected to the spring.

The pressure spring is expediently arranged on that side of the agitating arm which when considering the direction of rotation is the front side or leading side so that the relative load exerted by the pourable material and acting upon the individual spring leaves does not have to be absorbed by the pressure spring or pressure springs.

Figure 1:
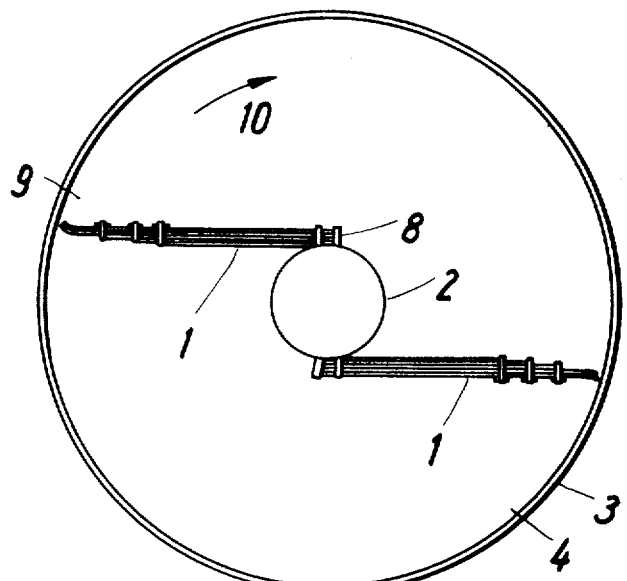

Referring now to the drawings in detail, the arrangement shown in FIG. 1 comprises a cylindrical drum-shaped rotor 2 having rotor arms 1 tangentially connected to the circumference thereof. Rotor 2 is rotatably journalled in the vertical central axis of a, for instance, cylindrical silo 3 and, more specifically, directly above the bottom 4 of said silo.

According to FIGS. 1–3, the rotor arms 1 are formed by a plurality of superimposed spring leaves 5, 6, 7 the inner ends of which are at the inner end 8 of the rotor arm 1 arranged adjacent to each other. The said spring leaves have different lengths so that the spring arms are in the direction toward the free end 9 of the respective arm 1 stepped in longitudinal direction. In this way, the cross section of the spring packet of the rotor arm decreases in the direction toward its free end 9. The respective shorter spring leaves are when viewing in the direction of rotation indicated by the arrow 10 of the rotor located behind the respective longer spring leaves. The spring leaves 5–7 are held together by holding means 11. In the longitudinal direction of each rotor arm 1, a plurality of holding means 11 are arranged one behind the other in spaced relationship to each other. According to the embodiment illustrated in FIGS. 2 and 3, the holding means 11 is formed by a rectangularly U-shaped bent sheet metal yoke 12 the transverse web 13 of which engages the outside, in other words, the outer surface 14, of a spring leaf 5. The illustrated yoke 12 is located in the vicinity of the outer end 15 of the spring leaf 5. The transverse yoke 13 is by means of two rivets 16 connected to leaf 5, said rivets extending rectangularly with regard to the longitudinal direction of spring leaf 5 and being located adjacent to each other, while the corresponding rivet heads 16 are countersunk in spring leaves 5.

The legs 17 of yoke 12 are slightly laterally spaced from the spring leaf packet and therefore limit a lateral displacement of the spring leaves. The spring leaves 5–7 engage each other in such a way that they can slidably be displaced relative to each other along their surfaces 18 in the longitudinal direction of the spring arm as indicated by the double arrow 19.

A spring yoke 21 is mounted on the free ends 20 of legs 17, said free ends 20 protruding beyond the outermost spring leaf 7. Spring yoke 21 has its ends 22 resting on the outside 23 of the leaf spring 7. The spring ends 22 have their engaging surface 24 convexly curved so that they can easily slide on the outer surface 23. In the center between its ends 22, the spring yoke 21 has in side view (FIG. 2) an approximately semi-circular bend 25 the concave side 26 of which is open toward the side facing away from the spring leaf packet. Spring yoke 21 is bent from a corresponding sheet metal strip corresponding in width to the spring leaves 5–7. Journalled in the two leg ends 20 of the U-shaped holding yoke 12 is a bolt 27 which consists of high-resistant steel and connects said leg ends. Bolt 27 is parallel to the sliding surfaces 18 and is perpendicular to the longitudinal extension of the spring leaf packet. The outer diameter of that section of bolt 27 which is located between the legs 20 and in the spring bend 25 corresponds to the inner diameter of the spring bend. Spring 21 is thus, by means of the bolt located in bend 25, pressed against the spring packet 5-7 and has its ends engaging the spring leaf 7 under a preload. Inasmuch as the concave surface of the pressure spring 21 snugly engages the bolt 27, it will be appreciated that when the pressure spring is placed under a load, an overload in the region of the concave surface which would be particularly endangered by a lever effect, will be avoided. The spring 21 is, as evident from FIG. 3, tapering from the central region toward its end, as far as width is concerned so that it is designed in the manner of a beam having uniform strength.

For purposes of mounting bolt 27, two aligned cylindrical recesses 28 are provided in the leg ends 20 of the U-shaped yoke 12. The inner diameter of the recesses 28 corresponds to the outer diameter of the bolt 27. Bolt 27 is provided with two circumferential grooves 29 having a width slightly greater than the thickness of the respective leg ends 20 and engaging recesses 28. Bolt 27 is introduced into these recesses so as to occupy a position which is coaxial with said recesses 28. Subsequently, the bolt is displaced outwardly at a right angle to its central axis so that one portion each of the marginal area of the pertaining recess 28 engages the corresponding circumferential groove 29. In this position, bolt 27 is held by spring 21.

As will be evident from FIGS. 2 and 3, the yoke-shaped spring 21 defines with its inner surface 30 and the oppositely located outer surface 23 of leaf spring 7 a hollow chamber in which in conformity with the present invention, a filling member 31 of soft rubber or the like is provided. The filling member 31 is as wide as spring 21 and is connected to the inner surface 30 thereof, for instance by vulcanization. The plane surface 32 of the filling member 31 does not engage the outer surface 23 of spring leaf 7 so that no friction and no wear occur. The filling member 31 prevents the silo material from entering the space between the spring packet and the pressure spring 21. The filling member 31 is substantially protected against wear by the pressure spring.

According to the embodiment of a rotor arm 1a as shown in FIGS. 4 and 5, spring 21a has substantially straight legs the rounded free ends 22a of which engage the outer surface 23a of the pertaining outermost leaf 7a of the spring leaf packet. Bolt 27a has one end provided with a cam 29a which is formed by an inserted transverse pin and which has associated therewith, at the bores 28a in the leg ends 20a of U-shaped yoke 12a, radial slots 33 so that bolt 27a when correspondingly pivoted can be passed through the recesses 28a, 33. After a corresponding pivot movement of bolt 27a, pin 29a engages the outside of the yoke leg 17a so that bolt 27a is by means of the pin secured against axial displacement in one direction. For purposes of securing the arrangement against displacement in the other direction, that end 34 of the bolt which faces away from pin 29a is bent off at a right angle. This end furthermore serves as lever arm for turning the bolt. When subjected to a load in operation, this lever arm will move in the longitudinal direction of the spring packet. In this position, the bolt is secured against axial displacement.

Instead of the bayonet connection by means of the longitudinal hole 33 and the transverse pin 29a on the bolt, also another holding means for the bolt may be provided. Thus, the bolt may at that end by which it is passed through the two circular cutouts of the holding yoke be provided with an annular groove or with two oppositely located grooves into which, following the passing of the bolt through said circular cutouts, a resilient ring adapted to be spread may be inserted. Such ring may for instance be in the form of a Seeger ring.

With the embodiment illustrated in FIG. 6, the holder 11b is formed by a helical torsion spring which is laterally located on the leaf spring packet 1b. The two ends 21b of the helical torsion spring 11b which angularly extend away from each other, have angled-off end sections 22b which are substantially parallel to the axis of said spring 11b. These end sections 22b are preloaded and engage the two outermost individual spring leaves 5b, 7b of the spring leaf packet 1b in such a way that they exert a pressure upon the leaf springs 5b, 6b, 7b. The end of that individual spring leaf 5b having associated therewith the holder or spring 11b is bent outwardly to form an eye 3b. The pertaining end section 22b of the corresponding spring arm 21b is passed through this eye 3b so that a positive connection of spring 11b with the leaf spring packet is obtained. Spring 11b may consist of round steel or of a steel with a quadrangular cross section and keeps the springs 5b-7b together in a clothespin-like manner.

It is, of course, to be understood that the present invention is, by no means, limited to the particular showing in the drawings but also comprises any modifications within the scope of the appended claims.

What I claim is:

1. A rotor arm for connection to a rotor of silo discharging devices, which includes: a plurality of relatively long and narrow spring leaves of different lengths slidably arranged one above the other, said spring leaves extending in one and the same direction to be free at one end thereof, holding means respectively arranged in spaced relationship to each other in the longitudinal direction of said rotor arm and embracing said spring leaves so as to hold said spring leaves together at only one fastening end thereof, and pressure exerting means associated with said rotor arm and subjecting said spring leaves to a compressing pressure in a direction at least approximately perpendicularly to those surfaces of said spring leaves which are slidable upon each other so as to hold adjacent spring leaf surfaces in firm sliding engagement with each other at a location more remote from said holding means and nearer the free end of said spring leaves.

2. A rotor arm according to claim 1, in which said pressure exerting means is formed by spring means.

3. A rotor arm according to claim 1, in which said pressure exerting means is supported by said holding means.

4. A rotor arm according to claim 2, in which said spring means slidably engages the free outer surface of one of said spring leaves.

5. A rotor arm according to claim 1, in which said holding means includes a supporting arm substantially parallel to and engaging that spring leaf of said rotor arm which is spaced farthest from said pressure exerting means, thereby forming a counter bearing with regard to said pressure exerting means.

6. A rotor arm according to claim 2, in which said spring means is in the form of a leaf spring having its central portion supported by said holding means and having lateral arms curved toward said rotor arm and having the free ends thereof resting under preload against the adjacent outer spring leaf.

7. A rotor arm according to claim 6, in which said spring means is pivotable about an axis extending transverse to the longitudinal extension of said rotor arm.

8. A rotor arm according to claim 5, in which said holding means includes two legs respectively arranged on opposite ends of said supporting arm and together therewith forming a U-shaped bracket, said legs being laterally slightly spaced from the respective adjacent edges of said spring leaves, and which includes bolt means supported by the free ends of said legs and supporting said pressure exerting means.

9. A rotor arm according to claim 8, in which said pressure exerting means is in the form of a spring leaf provided with a central portion having a contour corresponding to the circumferential contour of said bolt means and pivotably supported thereby, the free ends of said last mentioned spring leaf resiliently and under preload engaging the respective adjacent outermost spring leaf of said rotor arm.

10. A rotor arm according to claim 9, in which said bolt means near its ends has two reduced neck portions, and in which the free ends of said legs have cutout means engaging and supporting said neck portions.

11. A rotor arm according to claim 8, in which said bolt means has one end portion angled off and movably extending through one of said legs and has its other end portion movably extending through the other leg and forming a bayonet joint therewith for selectively locking said bolt means to said holding means.

12. A rotor arm according to claim 1, in which said holding means and said pressure exerting means form a single unitary structure.

13. A rotor arm according to claim 1, in which said holding means has at least one edge portion pointing toward the axis of rotation of said rotor arm inclined toward the central longitudinal axis of said rotor arm.

14. A rotor arm according to claim 2, in which said spring means includes helical torsion spring means arranged laterally of said spring leaves and having free arms respectively extending in opposite directions while under preload engaging the two outermost spring leaves.

15. A rotor arm according to claim 4, in which at least one of said free arms is positively connected to one of the outer spring leaves.

16. A rotor arm according to claim 2, in which the spring means forming said pressure exerting means tapers from a central portion towards its ends in the manner of a cantilever of equal strength along its length, said central portion having a width approximately equalling the width of said spring leaves.

17. A rotor arm according to claim 1, in which said pressure exerting means is in the form of a spring leaf convexly curved with regard to the adjacent outermost spring leaf of the rotor arm and having its free ends under preload in resilient engagement with said last mentioned outermost spring leaf of the rotor arm, said convexly curved spring leaf together with the spring leaf of the rotor arm engaged thereby defining a hollow chamber, elastic filling material filling said hollow chamber.

18. A rotor arm according to claim 17, in which said elastic filling material includes soft rubber material vulcanized to at least one of the walls defining said hollow chamber.

19. A rotor arm according to claim 17, in which the overall width of said filling material approximately equals the width of said rotor arm.

20. A rotor arm according to claim 1, in which said pressure exerting means is located on the leading edge side of the rotor arm.

* * * * *